(12) United States Patent
Chrysanthakopoulos et al.

(10) Patent No.: US 12,458,248 B2
(45) Date of Patent: Nov. 4, 2025

(54) WRITING SYSTEM (71) Applicant: BIC Violex Single Member S.A., Anoixi (GR)

(72) Inventors: Nikolaos Chrysanthakopoulos, Anoixi (GR); Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/482,653

(22) Filed: Oct. 6, 2023

(65) Prior Publication Data

US 2024/0115165 A1  Apr. 11, 2024

(30) Foreign Application Priority Data

Oct. 7, 2022 (EP) ..................................... 22200173

(51) Int. Cl.
| | | |
|---|---|---|
| *A61B 5/11* | (2006.01) | |
| *A61B 5/00* | (2006.01) | |
| *G06F 3/01* | (2006.01) | |
| *G16H 10/60* | (2018.01) | |
| *G16H 50/50* | (2018.01) | |

(52) U.S. Cl.
CPC ........... *A61B 5/1124* (2013.01); *A61B 5/1114* (2013.01); *A61B 5/4088* (2013.01); *A61B 5/6887* (2013.01); *A61B 5/7455* (2013.01); *G06F 3/016* (2013.01); *G16H 10/60* (2018.01); *G16H 50/50* (2018.01)

(58) Field of Classification Search
CPC ....... A61B 5/1124; A61B 5/05; A61B 5/4088; G16H 10/60; G09B 11/00; G09B 19/003; G09B 19/0038
See application file for complete search history.

(56) References Cited

U.S. PATENT DOCUMENTS

| | | | |
|---|---|---|---|
| 9,672,618 B1* | 6/2017 | Hassanain | G16H 50/20 |
| 10,496,193 B1 | 12/2019 | Alfano et al. | |
| 2014/0113258 A1* | 4/2014 | DeGoede | A61B 5/11 |
| | | | 434/155 |
| 2014/0226131 A1 | 8/2014 | Lopez et al. | |
| 2015/0279537 A1 | 10/2015 | Jobert et al. | |
| 2017/0199582 A1* | 7/2017 | Thomas, III | G06F 3/03545 |
| 2018/0098908 A1* | 4/2018 | Chien | A61H 23/00 |

(Continued)

OTHER PUBLICATIONS

Search Report issued in European Application No. 22200173, mailed on Mar. 6, 2023.

*Primary Examiner* — Peter R Egloff
(74) *Attorney, Agent, or Firm* — Bookoff McAndrews, PLLC (57) ABSTRACT

The present disclosure relates to a computer-implemented method for monitoring eye-hand coordination of a user of a digital writing instrument, comprising: monitoring the location of a writing tip of the writing instrument during a writing session with the writing instrument; monitoring the eye location of the user during the writing session; generating data by correlating the locations of the writing tip and of the user's eyes; comparing the generated data to historical data from the user; providing an indication in case that data of a current writing session of the user deviates from an average of historical data from the user; and storing generated data as historical data.

9 Claims, 5 Drawing Sheets

(56) References Cited

U.S. PATENT DOCUMENTS

2018/0158359 A1* 6/2018 Quinlan .................. G06F 3/013
2020/0337627 A1 10/2020 Penney et al.
2022/0309945 A1* 9/2022 Duffy .................. G06F 3/04883

* cited by examiner

WRITING SYSTEM

This application claims priority from the European patent application EP22200173, filed on Oct. 7, 2022, the entire content of which being incorporated herein by reference.

TECHNICAL FIELD

The present disclosure relates to a method for monitoring eye-hand coordination of a digital writing instrument's user and a system for monitoring eye-hand coordination of its user.

BACKGROUND

Alzheimer's Disease (AD) is a form of dementia, a neurodegenerative disease of the brain. The disease process is associated with amyloid plaques, neurofibrillary tangles, and loss of neuronal connections in the brain. Unfortunately, the cause of Alzheimer's disease is poorly understood. There are many environmental and genetic risk factors associated with it. The strongest genetic risk factor is from an allele of APOE gene. Other risk factors are history of head injury, clinical depression, and high blood pressure.

Mild Cognitive Impairment (MCI) is an early stage of memory loss or other cognitive ability loss (such as language or visual/spatial perception) in individuals who maintain the ability to independently perform most daily activities. Individuals with MCI may have a higher risk of developing dementia.

Regarding Eye-Hand Coordination there is a correlation between the coordination of eye-hand related movements and the potential of developing or having a cognitive disease. Patients were placed in front of a touchscreen and were asked to perform multiple tasks that required them to interact with the display while their eyes were monitored. By combining data from their hand movements (e.g., Hand error: difference in degrees between target position and final hand position, Eye touch interval: time between the initiation of the eye movement and the click-down), eye movements (e.g., Eye latency: time between target stimulus presentation and eye movement initiation), Eye error: difference in degrees between target position and final eye position) and their pupil characteristics (e.g., Pupil peak: maximum pupil dilation between target onset and the primary saccade), they were able to identify neurodegeneration on the visuomotor network which indicates the potential of Alzheimer's Disease or Mild Cognitive Impairment. The algorithm used showed an 12% improvement in accuracy in is classification (between healthy elderly and MCI patients) compared to an algorithm that utilized eye movement solely.

Another study that focused on the changes in relative timing of eye and hand movements for AD patients utilized a similar testing platform (consisting of a touch screen, an eye-tracking device, and a motion capturing system) and identified that AD patients use a stepwise approach of eye and hand movements to touch a sequence of stimuli, whereas healthy individuals more often show an anticipatory approach. The study also quantified the relative timing of both eye and hand movements in a series of eye-hand coordination tasks with different levels of complexity in AD patients. Additionally, it was shown that early-stage AD patients need more time to initiate and execute goal-directed hand movements in a pro-tapping task (track a change on screen and identify it with their hand), whereas initiation of a pro-saccade is not yet impaired.

A large cohort study by Altoida with 525 participants identified that hand and gait movements and errors, eye tracking and pupil dilation can be used to provide an AD prognostic accuracy of 94%, while also offering about 91% sensitivity and 82% specificity in predicting the progression of dementia, further supporting the data from the previous studies.

SUMMARY

In a first general aspect, the present disclosure relates to computer-implemented method for monitoring eye-hand coordination of a user of a digital writing instrument, comprising:
  monitoring the location of a writing tip of the writing instrument during a writing session with the writing instrument;
  monitoring the eye location of the user during the writing session;
  generating data by correlating the locations of the writing tip and of the user's eyes;
  comparing the generated data to historical data from the user;
  providing an indication in case that data of a current writing session of the user deviates from an average of historical data from the user, and storing generated data as historical data.

In embodiments, generating data comprises establishing a plurality of parameters such as eye latency, eye error, eye maximum velocity, and/or handwriting maximum velocity.

In embodiments, generating data comprises calculating the time between the user's writing instrument movement to a next row of a writing session and the user's gaze when a sentence is finished and/or calculating a discrepancy between the user's eye and writing instrument location.

In embodiments, the method may comprise monitoring a force of the writing tip during a writing session; and generating data by correlating the force of the writing tip and the locations of the writing tip and of the user's eyes.

In embodiments, the method may comprise generating a model of the user's handwriting performance from the stored historical data; and comparing the generated data to the model.

In embodiments, the method may comprise providing a writing surface, wherein the writing surface is a sheet of paper or a display.

In embodiments, the method may comprise alerting the user in case of an indication by activating a tactile feedback generator of the writing instrument; and/or providing haptic feedback to the user by activating a tactile feedback generator of the writing instrument.

In embodiments, the indication may be provided via a user interface of the writing instrument or wherein the indication is provided via a wireless communication system to an external device having an interface.

In a second general aspect, the present disclosure relates to a system for monitoring eye-hand coordination of its user, comprising:
  a writing instrument comprising one or more sensors configured to monitor the location of a writing tip of the writing instrument during a writing session with the writing instrument;
  a writing surface apparatus comprising an eye tracking system configured to monitor the eye location of the user during the writing session;
  the writing system further comprising a communication system configured to provide an indication in case that data of a current writing session of the user deviates from an average of historical data from the user, the communication system being part of the writing instrument or of the writing surface apparatus a computer system configured to execute the computer-implemented method for monitoring eye-hand coordination as described above, wherein the computer system is part of the writing instrument or of the writing surface apparatus; and a storage system configured to store generated data as historical data, the storage system being part of the writing instrument or of the writing surface apparatus.

The communication system may include a communication system for communicating with a user's personal device which is used for notifications. Otherwise, the communication system may include a feedback system e.g., a feedback generator for generating and providing notifications to the user.

In embodiments, the writing instrument comprises a tactile feedback generator configured to alert the user in case that data of a current writing session of the user deviates from an average of historical data from the user; and/or a tactile feedback generator configured to provide haptic feedback to the user.

In embodiments, the system may comprise a force sensor configured to monitor a force of the writing tip during a writing session, the force sensor being part of the writing instrument or of the writing surface apparatus, wherein the computer system is configured to generate data by correlating the force of the writing tip and the locations of the writing tip and of the user's eyes.

In embodiments, the one or more sensors are configured to monitor at least one of cartesian coordinates of the writing tip location, a writing tip's force against the writing surface, a writing instrument's angle, a velocity of the writing instrument, an acceleration of the writing instrument, and a trajectory of the writing instrument.

In embodiments, the eye tracking system comprises an infrared light-emitting diode, a CMOS sensor configured to identify IR light, and a lens subassembly configured to focus received IR light to the CMOS sensor.

In embodiments, the writing instrument comprises a hand presence sensor configured to obtain information regarding a usage state of the writing instrument.

In embodiments, the writing instrument and/or the writing surface apparatus comprises a user interface configured to receive input from a user and/or to provide information to the user such as the indication; and/or a wireless communication system configured to provide the indication via an external device having an interface.

In embodiments, a system is enabled to gather useful metrics regarding the user's eye-hand coordination during a writing exercise while being transparent to the user. This may include to track the user's eye movement and location and to track the user's pen location.

In embodiments, the users are enabled to have historical data of their writing performance statistics regarding their eye-hand coordination over the time they have been using the present disclosure. Errors generated by the user while writing between their writing instrument's location and their eye location e.g., Eye error: difference in degrees between target position and final eye position, Hand error: difference in degrees between target position and final hand position, etc. can be indicators of the potential of cognitive impairment.

Given that cases of dementia and Alzheimer's Disease are increasing over the world, an indication is provided to the user of the potential of developing any form of cognitive disorder. Thus, the user can be alerted in order to visit a medical diagnostic center.

In embodiments, a user is enabled to be notified over the potential of developing a cognitive disorder via the use of a Writing Eye-Hand Coordination System. This is enabled by a system that monitors and tracks the user's eye movements and pen location over time while they are performing writing tasks.

In embodiments, a writing digitization component on the writing surface is capturing and monitoring the location of the user's writing instrument while they are using the device. Additionally, the writing surface is equipped with an eye-tracking mechanism that can determine the user's eye/reading location on the device's surface, with a high enough accuracy that it can distinguish between each written letter.

In embodiments, the user initiates their note taking process as usual by placing a blank paper on the Writing Surface Apparatus. As they write down their notes, everyday tasks or specific exercises, the system correlates their eye movements to their handwriting i.e., the exact location of the pen's nib as it comes in contact with the writing surface, and in examples the pen's movement in space above the writing surface and generates historical data on at least one of the following metrics:

1. Eye latency: time between target stimulus presentation and eye movement initiation
2. Eye maximum velocity: maximum eye movement velocity during handwriting
3. Eye error: difference in degrees between target writing position and final eye position
4. Saccadic amplitude: amplitude of the primary saccade divided by target amplitude.
5. Number of saccades: number of saccades made during the writing task
6. Handwriting maximum velocity: maximum handwriting speed
7. Hand error: difference in degrees between target pen tip position and final pen tip position
8. Eye handwriting latency: time between the initiation of the eye movement and the pen's tip reaching the target location
9. Hand total distance: total distance bridged by the hand movement holding the pen during the writing task
10. Pupil peak: maximum pupil dilation between target onset and the primary saccade
11. Pupil latency: time from target onset until maximum pupil dilation occurs
12. Pupil baseline: mean pupil dilation during the fixation period In embodiments, over time and after multiple sessions, the system has enough historical data to create a model of the user's handwriting performance. If any or multiple parameters from the aforementioned list deviate significantly from the expected user's handwriting performance metrics, the user is notified.

In embodiments, the user is alerted by a mobile device connected to the smart pen or alternatively by a tactile feedback mechanism on the pen. Tactile feedback mechanism can generate frequencies below 500 Hz and is located as close to the tip of the writing instrument as possible, to ensure that the vibrations are felt by the user's finger tips. The fingertips are sensitive enough that can differentiate and identify a wide range of vibration frequencies.

In embodiments, the device also incorporates the required electronics and software drivers for connecting wirelessly e.g., Bluetooth, Wi-Fi, etc. to an optional supplementary device.

In embodiments, the system can now in real time, capture the user's handwriting location and movement in addition to their eye gaze and location, generate a series of metrics and compare it to previous known historical data on that specific user's writing performance. If the current data deviate significantly from the historical average, for multiple sessions, the writing instrument will notify the user by a mobile device app alert or via a series of tactile vibrations on the pen. This alert will signal the user to go and seek medical attention.

An example system of the present disclosure may provide the following features:
- A writing surface apparatus capable of accurate eye-tracking and digitization of a pen input.
- A storage medium in the system for storing the historical data over the device's lifetime.
- A feedback device on the smart pen that can receive signals from the main writing surface and provide tactile feedback to the user.
- An algorithm that can correlate the user's writing location on the surface, to their eye location to generate and store metrics (writing performance) that can be associated with cognitive diseases.
- An algorithm responsible for comparing the data to the historical ones and hence providing an indication to the user in the event that their current writing performance has been reduced which could be associated with dementia or cognitive disorders.

Particular examples of the first to second general aspects can be implemented so as to realize one or more of the following advantages.

First, a system is provided for enabling the user to be notified on the potential of developing a cognitive disorder e.g., AD, MCI, etc. and seek medical attention to confirm the findings. The writing instrument may be considered among others as a wellness device.

Second, the present disclosure enables a system, which is constantly monitoring the user's writing performance and characteristics on the writing surface via the combination of data gathered by an eye-tracking system and handwriting digitization layer while they perform their usual writing tasks. The data are used to calculate multiple metrics that correlate their handwriting to their eye movements. As the user is taking notes or performing tasks that require writing, over time, the device is creating a profile that can be used as reference.

Third, if the current data e.g., the user's current eye motion in comparison to their current writing location varies significantly e.g., eye movement is significantly faster than their pen's tip when changing a line for multiple writing and/or drawing sessions, the pen can notify them and indicate the need for medical attention to confirm or deny the potential development of a cognitive disorder. Said system is always adapting to the user's current state and does not need any additional maintenance.

With the rise in sales of portable devices and more especially wearables, and the consumer need for thinner and smaller devices, haptic and tactile feedback technologies have been miniaturized to the degree that they can fit in a small form-factor device. Such devices range from vibration motors to linear actuators and piezoelectric crystals, which can accomplish complex haptic sensations with a low-power requirements.

Regarding writing action, handwriting is the writing action done with a writing instrument, such as a pen or pencil, using the hand. Handwriting includes both printing and cursive styles. Handwriting involves the use of a pen or pencil or any suitable writing instrument which the user keeps holding with his hand/fingers even when he does not write.

The normal grip of a writing instrument may be performed in the following way:
- the writing instrument is held in a stable position between the thumb, index and middle fingers,
- the ring and little fingers are bent and rest comfortably on the table,
- the index finger and thumb form an open space,
- the wrist is bent back slightly, and the forearm is resting on the table,
- the writing instrument is held about 1-2 cm from the tip.

So, especially while writing, a user exerts a gripping force on the body of the writing instrument which and as previously described may be a pen.

Certain terms are used in the following manner in the present disclosure:

The expression "Writing Instrument Barrel" may refer to a main body of the writing instrument that provides the core structure of the pen and comes in direct contact with the user's fingertips.

The expression "digital device" may refer to an electronic device that uses discrete, numerable data and processes for all its operations, and is capable of displaying content to the user. Examples of such a device include but are not limited to: Mobile phones, Laptops, Tablets, Personal computers, Netbooks, iPads, etc.

The expression "haptic or tactile feedback" may refer to a physical response on a digital device from the user input, also known as kinesthetic communication. The application with mechanical or electronic means of force, vibrations, or motions to the user in response to a user's action on the digital device.

The expression "eye-tracking" may refer to the process of measuring either the point of gaze or the motion of an eye relative to the head. An eye tracker is a device for measuring eye positions and eye movement with a variety of hardware which usually includes infrared cameras.

The expression "human machine interface" may refer to a user interface or dashboard or an input system that connects a person to a machine, system, or device. For example, a physical button on a remote controller.

The expression "Handwriting air-time" may refer to the time spent of the writing instrument not in contact with the writing surface between two consecutive writing strokes e.g., the time spent between writing each letter.

The expression "group of users" may refer to a panel of users selected through specific methodology, with the scope to test products and provide feedback, in order to provide statistical insights to specific parameters of the products and their respective use.

DETAILED DESCRIPTION

Figure 1:
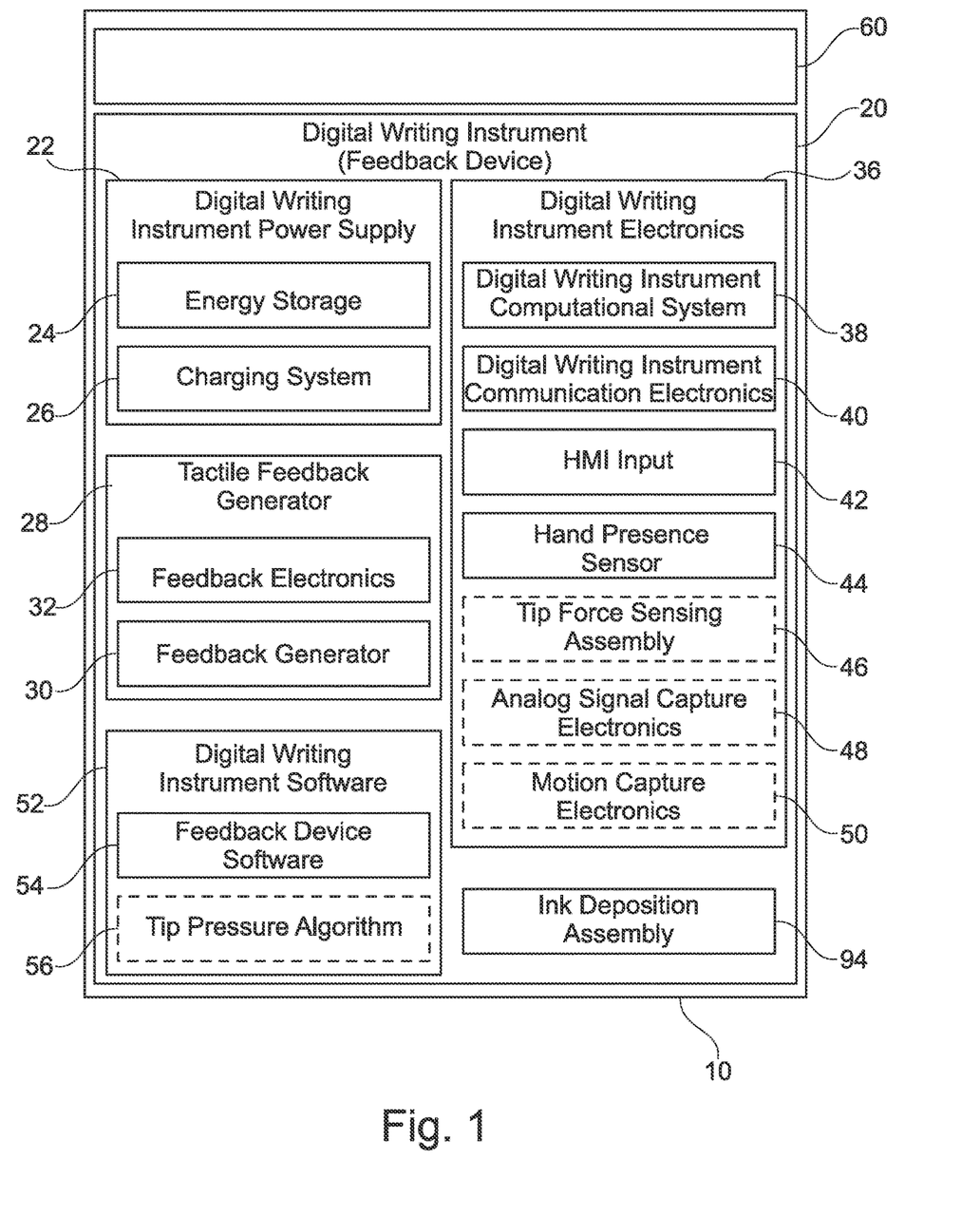
FIG. 1 illustrates an overview of components of a writing system and a writing instrument according to the present disclosure.

FIG. 1 shows an overview of components of a writing system 10 including a writing instrument 20 which can give feedback to its user and a writing surface apparatus 60 which includes an eye tracking system according to the present disclosure.

An example of the writing surface apparatus 60 may also include paper and enables the user to monitor their eye-hand coordination during the process of writing. Further, the writing surface apparatus 60 may alert the user in the event that there is significant variance in the measurements, which could indicate the potential of a cognitive disorder. Additionally, the device is also responsible for securing the paper used for handwriting.

The writing instrument 20 can be named (smart) Pen, feedback device, digital writing instrument or digital device. The writing instrument 20 may be in the form of a digital writing instrument with ink with which the user performs the handwriting action and is responsible for transferring the vibrational patterns to the user's fingertips and aiding in the capture of the instruments motion.

An example of the writing instrument 20 enables the user to monitor the location of a writing tip of the writing instrument 20 during a writing session with the writing instrument 20.

As shown in FIG. 1, the writing instrument 20 includes a power supply 22 to provide the energy for the following sub-systems of the writing instrument 20. The power supply 22 includes a subsystem energy storage 24 which is the energy source of the writing instrument 20 and can be of the form of a battery. The power supply 22 includes a subsystem charging system 26 which includes the electronics for charging and maintaining the health of the energy storage 24.

The writing instrument 20 includes a subsystem tactile feedback generator 18 that is capable of receiving digital data and converting them into vibrations that can be felt by the user. Hence, its location can be as close to the user's finger tips as possible i.e., close to the tip of a digital pen.

The tactile feedback generator 28 includes a subsystem feedback generator 30 that is responsible for converting the analog electrical signals i.e., electrical energy into mechanical energy in the form of vibrations that can be felt by the user i.e., the user's fingertips. The subsystem may generate vibrations in the range of 0 to 500 Hz with a controllable amplitude, while being power efficient enough to be integrated within a portable consumer product.

The feedback generator 30 can be of the form but not limited to at least one of rotary motors with a weight off the center of rotation, linear vibration motors, and piezoelectric vibration motors.

The tactile feedback generator 28 includes feedback electronics 32 that include the hardware i.e., motor drivers and firmware for converting the digital signal e.g., in the form of binary into an electrical e.g., analog signal that can drive the feedback generator 30.

The writing instrument 20 includes a subassembly ink deposition assembly 34 that includes the components for the digital writing instrument to deposit ink on the target surface i.e., the paper secured on the digitization layer. The ink deposition assembly 34 encompasses at least one of the ink cartridge, the ink deposition mechanism (e.g., a ball point), and the ink.

The writing instrument 20 includes a component digital writing instrument electronics or device electronics 36 which enables the writing instrument 20 to function.

The device electronics 36 include a subsystem digital writing instrument computational system 38 that includes the electronics and firmware for the digital writing instrument 20 to function. The main function of this subsystem is to coordinate the hardware of the feedback device such that it responds to the user's and writing surface apparatus' 60 requests i.e., manage the digital writing instrument power supply 22, receive data from the writing apparatus communication electronics 40, and send data to the tactile feedback generator 28.

The device electronics 36 may include a subcomponent digital writing instrument communication electronics 40 for establishing a wireless connection between the digital writing instrument 20 and other devices such as the writing surface apparatus 60 or a digital device, a mobile phone, a personal computer, etc.). The communication protocol could be of the form but not limited to at least one of Bluetooth, NFC, and Wireless Fidelity (WiFi).

The device electronics 36 include a subsystem human machine interface (HMI) input 42 that includes the hardware and software for the writing instrument 20 to accept human input and display its state to the user. The physical input interface of the writing instrument 20 could be of the form of a button, a rotational encoder wheel, or a linear slider. The display element of this interface can be at least one LED light of single or multiple colors. The input and display interfaces are read and controlled by the digital writing instrument software 52.

The device electronics 36 include a subcomponent hand presence sensor 44 that gives feedback to the device regarding its usage state i.e., if it is being held or used or if it is resting on a surface. The hand presence sensor 44 is located on the pen barrel close to the area that the user is making direct contact with their fingertips. Said information can be used to enhance the accuracy of the algorithm that calculates the user's air-time and/or if the device should enter a "sleep" mode.

The sensor used can be of the form of at least one of capacitive sensors, optical proximity sensors, ultrasonic proximity sensors, time of flight sensors, and piezoelectric sensors.

The device electronics 36 may include a subassembly tip force sensing assembly 46 that encompasses the hardware for converting mechanical pressure into an electrical signal. The purpose of this subassembly is to measure the force that is exerted on the pen tip to the writing surface while the user is utilizing the writing instrument 20.

In embodiments, the pen tip may be mechanically connected to the ink cartridge (a hollow metal or plastic tub that store the ink). Said ink cartridge could be connected to the main body of the writing instrument (i.e., the pen barrel) either by being press fit into the opening of the pen barrel (the area that house the pen tip is conical and is pressed into the corresponding conical opening of the pen barrel), or by being mechanically secured between the rear end of the pen barrel and a separate component that is secured (press fit or via threads) on the front of the pen barrel.

In the former example, the pen tip pressure is transferred via the conical attachment to the pen barrel, while in the later it is transferred via the rear end of the barrel. Therefore, it would be beneficial to the invention, to locate the force sensors in the previously described sections.

The type of the force sensors could be at least one of piezoelectric materials, strain gauges, load cells, optical fiber force sensors, optical sensors, induction sensors, and piezoelectric (PE) nanogenerators.

In the event that the ink cartridge is secured between the front and rear end of the pen barrel, and it does not come in contact with the rear end of the barrel (e.g., spring loaded mechanism) a ring of a material that can convert mechanical pressure to an electrical signal (i.e., piezoelectric material) can be attached on the ink cartridge (the inner area of the ring) while also being secured on the pen barrel.

The device electronics 36 may include a subcomponent analog signal capture electronics 48 that encompasses all electronics including the physical and digital signal filters and the analog to digital converter A2D as well as firmware to capture an analog signal from the tip force sensing assembly 46 and convert it into a digital format.

The device electronics 36 may include a subcomponent motion capture electronics 50 that includes the hardware and firmware that would enable the system to track the writing instrument's motion (i.e., speed, acceleration) in real time while it is above the main writing surface. The motion capture electronics 50 may include at least one of Inertial Measurement Unit (IMU), accelerometer, gyroscope, and magnetometer.

The writing instrument 20 includes a software application digital writing instrument software 52 running on the digital writing instrument computational system 38. The digital writing instrument software 52 includes a feedback device software 54 and a tip pressure algorithm 56 that encompass the following functions:

- Receive the data from the Digital Device via the Digital Device Communication Electronics 40.
- Send the appropriate signals to the Tactile Feedback Generator 28 in the correct timing.
- Control the amplitude of the vibration via the Feedback Electronics 32 in accordance with the user needs (the user can adjust the intensity of the vibration).
- In the embodiment that the Digitization Layer used cannot supply pressure and/or motion data, use the tip force sensing assembly 46 and/or the motion capture electronics 50 to capture the required data and transmit them to the writing surface apparatus 60.

Figure 2:
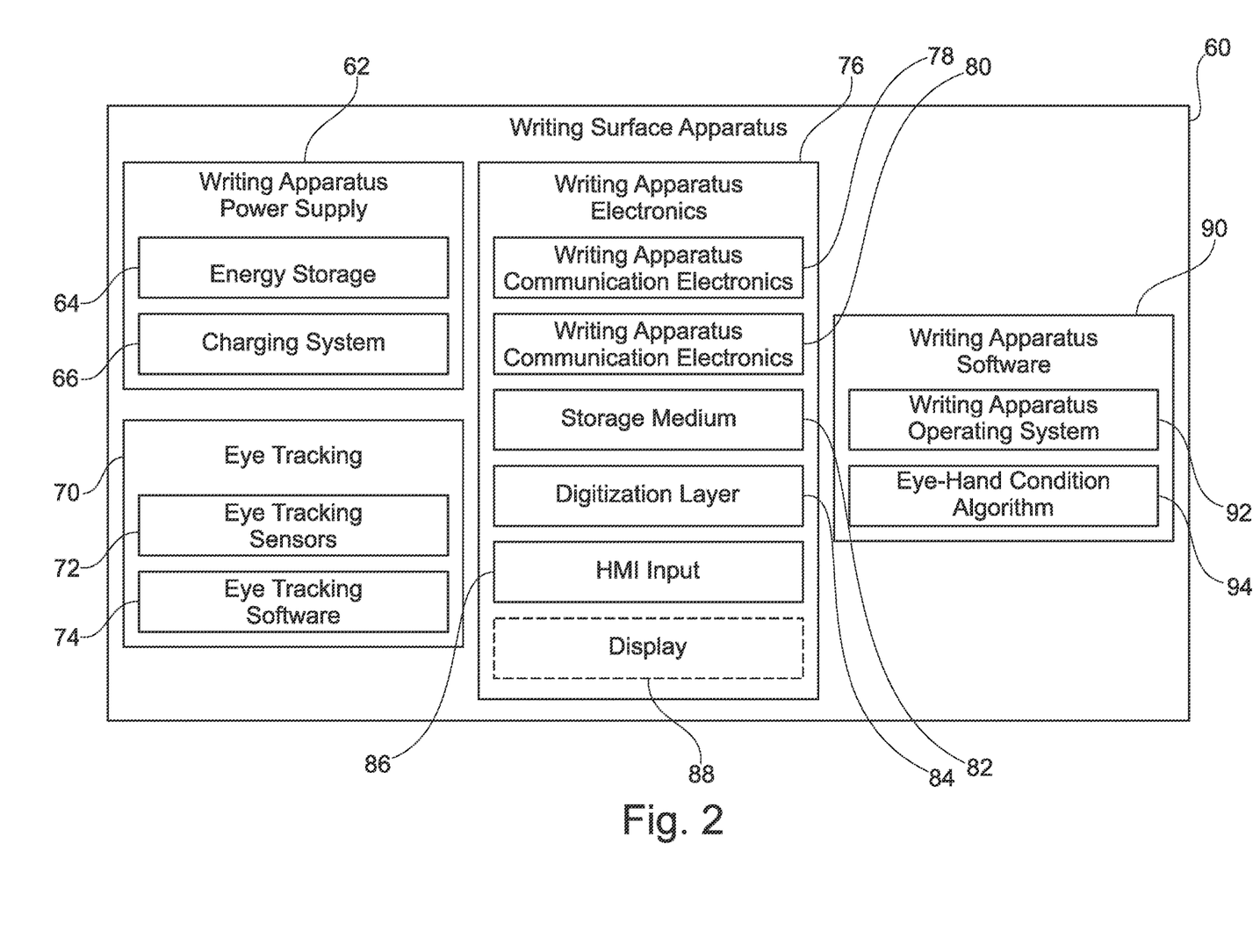
FIG. 2 illustrates an overview of components of a writing surface apparatus according to the present disclosure.

FIG. 2 illustrates an overview of components of the writing surface apparatus 60 according to the present disclosure.

The writing surface apparatus 60 includes a writing apparatus power supply 62 to provide the energy for the following sub-systems of the writing surface apparatus 60. The power supply 62 includes a subsystem energy storage 64 which is the energy source of the writing surface apparatus 60 and can be of the form of a battery. The power supply 62 includes a subsystem charging system 66 which includes the electronics for charging and maintaining the health of the energy storage 64.

The writing surface apparatus 60 includes an eye tracking system 70 that is responsible for determining the gaze location and movement of the user.

The eye tracking system 70 includes a subassembly eye tracking sensors 72 encompassing the lenses, sensors, light emitting devices and electronics to gather the necessary data to accurately determine the user's eye movements and directions. The Eye Tracking Sensors 72 may include at least one of an Infrared Light-emitting Diode (IR LED), a CMOS sensor capable or identifying IR light, and a lens subassembly capable of focusing the received IR light by the CMOS sensor.

The eye tracking system 70 includes a software application Eye Tracking Software 74 responsible for gathering the information supplied by the Eye Tracking Sensors 72 and through data filtering and calculations output an estimated location, speed, and direction of the user's gaze with respect to the Digitization Layer's Area (i.e., the resulting location of the user's eyes needs to be referenced to the Digitization Layer's resolution, such that a pixel level location estimation could be extrapolated. For example, in a 1920 by 1080-pixel wide area, if the user is looking at the center group of 25 pixels an eye location estimate of 5 by 5 pixels should be returned.

The writing surface apparatus 60 includes a component Writing Apparatus Electronics 76.

The Writing Apparatus Electronics 76 includes a subsystem Writing Apparatus Computational System 78 that includes the hardware required for the Writing Surface Apparatus 60 to function. The main function of this subsystem is to run the Writing Apparatus Operating System 92 and coordinate the hardware of the device such that the user's requests (and inputs) to the device are recognized and executed accordingly. Said subsystem include the Central Processing Unit (CPU), as well as the required Random-Access Memory (RAM) and Read Only Memory (ROM).

The Writing Apparatus Electronics 76 includes a subcomponent Writing Apparatus Communication Electronics 80 that can establish a wireless connection between the Writing Surface Apparatus 60 and other devices such as the Digital Writing Instrument 20. The communication protocol could be at least one of Bluetooth, Wireless Fidelity (WiFi), and NFC.

The device electronics 76 include a subcomponent storage medium 82 that includes the hardware, firmware and software for the system to store data captured by the system. Moreover, this subcomponent allows the writing instrument operating system or device operating system 92 to load said data and utilize it for a wide range of uses e.g., data comparison, data viewing, data deletion, etc.

The storage medium 82 could be of the form but not limited to at least one of magnetic storage, optical storage, and solid state storage (e.g., NAND Flash, NOR Flash, etc.).

The device electronics 76 include a subsystem Digitization Layer 84 that encompasses the hardware and software to accurately capture (digitize) and monitor the Digital Writing Instrument's 20 motion and location on the area that it covers. Additionally, on the top of said subsystem, a securing mechanism enables the user to fix the location of a piece of paper that is of similar size and provide a surface for the Writing instrument 20 to write upon.

The output of this subsystem may include at least one of:
- Cartesian coordinates of the Writing Instrument's pen tip location on the Writing surface.
- The Writing Instrument's pen tip pressure against the writing surface (to signify the start of a writing event).
- The Writing Instrument's angle in comparison to the Writing Surface.
- The velocity of the Writing Instrument as it travels on top of the Writing Surface.
- The acceleration of the Writing Instrument as it travels on top of the Writing Surface.
- The trajectory of the Writing Instrument as it travels on top of the Writing Surface.

The device electronics 76 include a subsystem Human Machine Interface (HMI) Input 86 that includes the hardware and software for the device to accept human input and display its state to the user. The physical input interface of the device could be of the form of a button, a rotational encoder wheel, or a linear slider. The display element of this interface can be at least one LED light of single or multiple colors. The input and display interfaces are read and controlled by the Device's Operating System 92.

The device electronics 76 may include a subcomponent display 88 that encompasses the electronics as well as display elements for refreshing, updating, and displaying content to the user. The display types could be at least one of Liquid Crystal Display (LCD), Organic Light-emitting Diode Display (OLED), and Light-emitting Diode Display (LED).

The display 88 can operate as a writing surface (replace the physical paper) or provide a Human Machine Interface for the user that could present valuable metrics regarding their writing performance.

The Writing Surface Apparatus 60 includes a subcomponent device software or writing apparatus software 90.

The writing apparatus software 90 includes a Writing Apparatus Operating System 92 also known as Operating System (OS) that manages the device's hardware, software resources, and provides common services for software programs and application specific algorithms. The main device software could be of the form but not limited to Android OS, Linux OS, or Application Specific OS.

The writing apparatus software 90 includes an algorithm Eye-Hand Coordination Algorithm 94 which is responsible for taking data from the Eye Tracking System 70 and from the Digitization Layer 84 and correlating the location of the user's eyes to a specific contact point between the Digital Writing Instrument 20 and the Writing Surface.

Additionally, the algorithm is capable of generating the following metrics:
i. Eye latency: time between target stimulus presentation and eye movement initiation
ii. Eye maximum velocity: maximum eye movement velocity during handwriting
iii. Eye error: difference in degrees between target writing position and final eye position
iv. Saccadic amplitude: amplitude of the primary saccade divided by target amplitude.
v. Number of saccades: number of saccades made during the writing task
vi. Handwriting maximum velocity: maximum handwriting speed
vii. Hand error: difference in degrees between target pen tip position and final pen tip position
viii. Eye handwriting latency: time between the initiation of the eye movement and the pen's tip reaching the target location
ix. Hand total distance: total distance bridged by the hand movement holding the pen during the writing task
x. Pupil peak: maximum pupil dilation between target onset and the primary saccade
xi. Pupil latency: time from target onset until maximum pupil dilation occurs
xii. Pupil baseline: mean pupil dilation during the fixation period Said algorithm may be running in the background constantly and comparing its currently generated metrics to historical data that are read from the Storage Medium 82.

In view of the data generated by the algorithm if any or a combination of thereof metrics varies significantly in the current session, the system can now generate a signal that is sent to the Tactile Feedback Generator 28 order to inform the user of the potential of a cognitive disorder. It should be noted that during the first sessions, the smart pen will be creating a baseline (calibration process) and it will not be capable of providing any form of feedback to the user The Writing Surface Apparatus 60 may include a writing surface for writing action of the writing instrument. The writing surface may be digital or analog and includes a writing area pressure sensor for monitoring or measuring the force between the writing tip of the writing instrument and a writing surface during a writing session with the writing instrument.

The Writing Surface Apparatus 60 may include a haptic engine. It is possible to integrate the Tactile Feedback Generator 28 within the Writing Surface Apparatus 60. In this case, the system does not require a separate Feedback Device, as the user can feel the vibrations while using the device. However, the Tactile Feedback Generator 28 needs to be placed in the location that the user is most probable to hold the device from (i.e., near the edges of the device), and the device needs to be portable.

Figure 3:
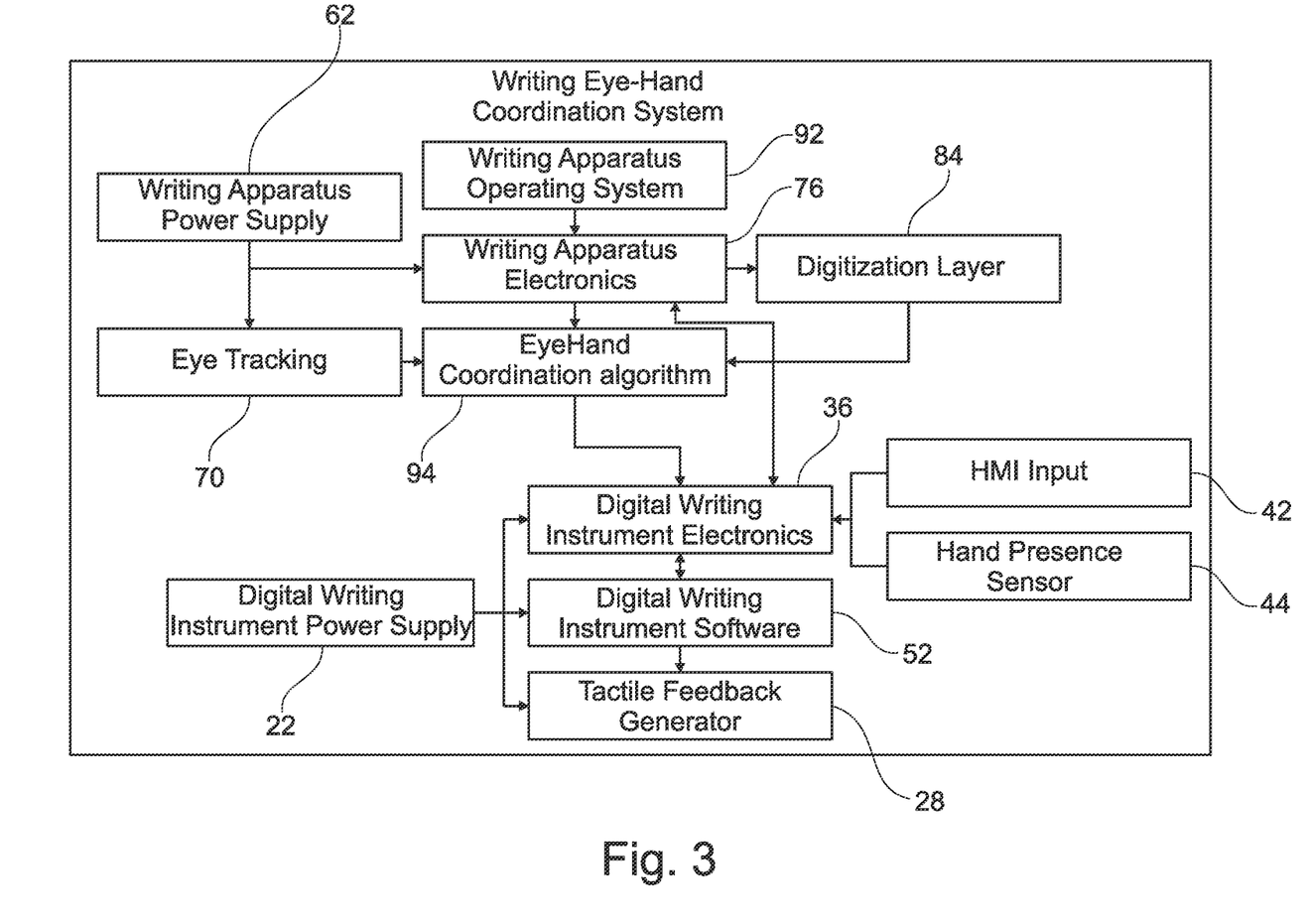
FIG. 3 illustrates a process flow diagram of a writing system according to the present disclosure.

FIG. 3 illustrates a process flow diagram of a writing system 10 especially a writing eye-hand coordination system according to the present disclosure.

The writing eye-hand coordination system includes components of the writing instrument 20 which are depicted in the lower portion of FIG. 3 and components of the writing surface apparatus 60 which are depicted in the upper portion of FIG. 3.

The single components and their functions have been described above in conjunction with FIG. 1 and FIG. 2. Here, the interaction of the components is described.

The writing apparatus power supply 62 supplies power to the eye tracking system 70 and to the writing apparatus electronics 76. The writing apparatus operating system 92 provides the software to the writing apparatus electronics 76. The writing apparatus electronics 76 include the digitization layer 84 which captures and digitizes the motion and/or location of the writing instrument 20.

The eye-hand coordination algorithm 94 receives data from the eye tracking system 70, the writing apparatus electronics 76, and the digitization layer 84. The eye-hand coordination algorithm 94 correlates the location of the user's eye to a specific contact point between the digital writing instrument 20 and the writing surface.

Regarding the digital writing instrument 20, the digital writing instrument power supply 22 supplies power to the tactile feedback generator 28, the digital writing instrument software 52, and the digital writing instrument electronics 36.

The HMI input 42 and the hand presence sensor 44 input their data to the digital writing instrument electronics 36. The digital writing instrument electronics 36 receives further input from the eye-hand coordination algorithm 94. The digital writing instrument electronics 36 is further in communication with the writing apparatus electronics 76.

The digital writing instrument electronics 36 passes the received and/or computed data to the digital writing instrument software 52. The digital writing instrument software 52 controlled the tactile feedback generator 28 in order to provide an indication to the user in case that data of a current writing session of the user deviates from an average of historical data from the user.

Figure 4:
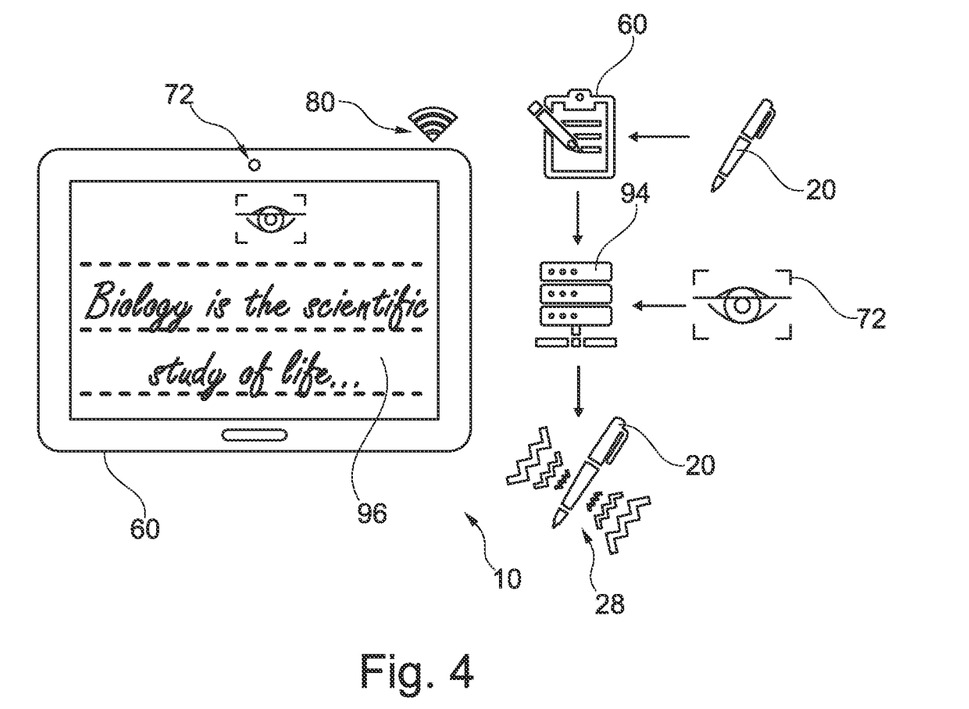
FIG. 4 illustrates a perspective view of a writing system according to the present disclosure.

FIG. 4 illustrates a perspective view of a writing system 10 according to the present disclosure. The writing system 10 can correspond to the writing system 10 as depicted in FIG. 1.

At the left side of FIG. 4, the writing surface apparatus 60 is depicted which may have the form of a tablet. The writing surface apparatus 60 includes the eye tracking sensors 72 and the communication electronics 80 for communicating with the digital writing instrument 20. The writing surface apparatus 60 further includes the writing surface 96 on which the writing instrument 20 can write and/or sketch.

At the right side of FIG. 4, a brief overview of monitoring eye-hand coordination of the user of the digital writing instrument 20 is given. At the top, the user is writing with the writing instrument 20 on the writing surface 96 of the writing surface apparatus 60. In the middle, the eye tracking sensors 72 convey that data to the eye-hand coordination algorithm 94 for comparing the generated data to historical data from the user. At the bottom, the user is informed by the tactile feedback generator 28 of the writing instrument 20 in case that generated data deviates from an average of historical data from the user.

A measure for the deviation could be with respect to eye latency alone a difference of 80 ms or larger with a baseline of 400 ms i.e., approximately 30% difference. Regarding eye-hand coordination, a difference around 200 ms between MCI and control subjects with a baseline of 800 ms i.e., a difference approximately in the range of 10% to 30%, exemplary between 18% to 22% and more exemplary of 20% is considered. Overall, a deviation of around 10% could indicate AD, while anything larger than 30% could indicate MC.

Figure 5:
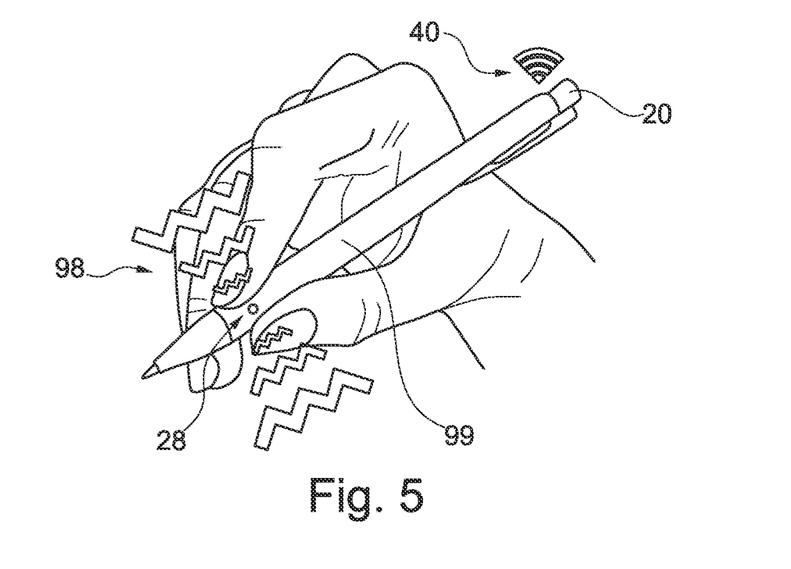
FIG. 5 illustrates a perspective view of a writing instrument according to the present disclosure.

FIG. 5 illustrates a perspective view of a writing instrument 20 according to the present disclosure. The writing instrument 20 can correspond to the writing instrument 20 as depicted in FIG. 1.

The writing instrument 20 includes a tactile feedback generator 28 which is arranged in a grip section 98 of the writing instrument 20. The tactile feedback generator 28 may be part of a communication system or is a communication system to provide an indication in case that data of at least two writing sessions of the user deviates from an average of historical data from the user. Thus, the tactile feedback generator 28 can alert the user if there is significant variance in the measurements, which could indicate the potential of a cognitive disorder.

The writing instrument 20 includes a barrel shaped body with a writing tip. The writing tip could be an ink writing tip or a digital writing tip. The HMI input 42 includes in this example as selection wheel as well as the marker e.g., in form of a pointer orientated towards the selection wheel. The writing instrument 20 may further include an HMI display or HMI output which is capable of indicating information like e.g., status information of the writing instrument 20 to the user. The HMI output may be arranged at an end opposite to the writing tip and may have the form of an LED strip.

The grip section 52 is located close to the writing tip. At the grip section 52, the hand presence sensor 44 is located on the pen barrel close to the area that the user is making direct contact with their fingertips.

In examples, the user may adjust the amplitude of the vibrations of the tactile feedback generator 28 via the HMI input 86.

The writing instrument 20 may further include a force sensor 99 configured to monitor a force of the writing tip during a writing session. Accordingly, data is generated by correlating the force of the writing tip and the locations of the writing tip and of the user's eyes. The force sensor 99 may be part of the writing surface apparatus 60 in an alternative embodiment.

The one or more sensors of the system may monitor at least one of cartesian coordinates of the writing tip location, a writing tip's force against the writing surface, a writing instrument's angle, a velocity of the writing instrument, an acceleration of the writing instrument, and a trajectory of the writing instrument.

In embodiments, the writing system may comprise a magnetic element (not shown) that can be fixed on the writing instrument. In examples, the magnetic element may be a magnetic ring. The ring may be fixed onto the outer periphery of the body of the writing instrument, proximal to the writing tip of the writing instrument. In examples, the ring surrounds the body made of non-magnetic material of the writing instrument. The magnetic ring may be of cylindrical shape comprising a cylindrical outer face of circular cross section. The ring may also comprise an outer layer of magnetic material and an inner layer of, for example, elastic material thereby making the magnetic ring deformable upon the introduction of the writing instrument into the ring without deforming the layer of the magnetic material. Such magnetic ring is briefly described in document US2015279537A1, its content being herein incorporated by reference in its entirety. Other magnetic elements may also be contemplated without deviating from the teachings of the present disclosure.

The writing system may comprise a writing surface apparatus comprising an eye tracking system configured to monitor the eye location of the user during the writing session. The writing surface apparatus may also comprise at least one magnetometer which is fixed on the writing surface apparatus and is configured to measure the magnetic field that is generated by the magnetic element, e.g. a ring. The writing system may also comprise a communication system that is configured to provide an indication in case that data of a current writing session of the user deviates from an average of historical data from the user, the communication system being part of the writing instrument or of the writing surface apparatus. The writing system may also comprise a computer system that is configured to execute the computer-implemented method for monitoring eye-hand coordination substantially as described herein, wherein the computer system may be part of the writing surface apparatus. In examples, the writing system may comprise a storage system that is configured to store generated data as historical data, wherein the storage system may be part of the writing surface apparatus 60.

The writing surface apparatus may be configured to measure the position and orientation of the magnetic element and consequently of the writing instrument thereby monitoring the location of the writing tip of the writing instrument during a writing session with the writing instrument. In detail, the at least one magnetometer of the writing surface apparatus measures the direction and the intensity of the magnetic field generated by the magnetic element, e.g. the ring. In examples, the writing surface apparatus may comprise a plurality of magnetometers where each magnetometer measures the direction and the intensity of the magnetic field generated by the magnetic element that is fixed on the writing instrument.

Figure 6:
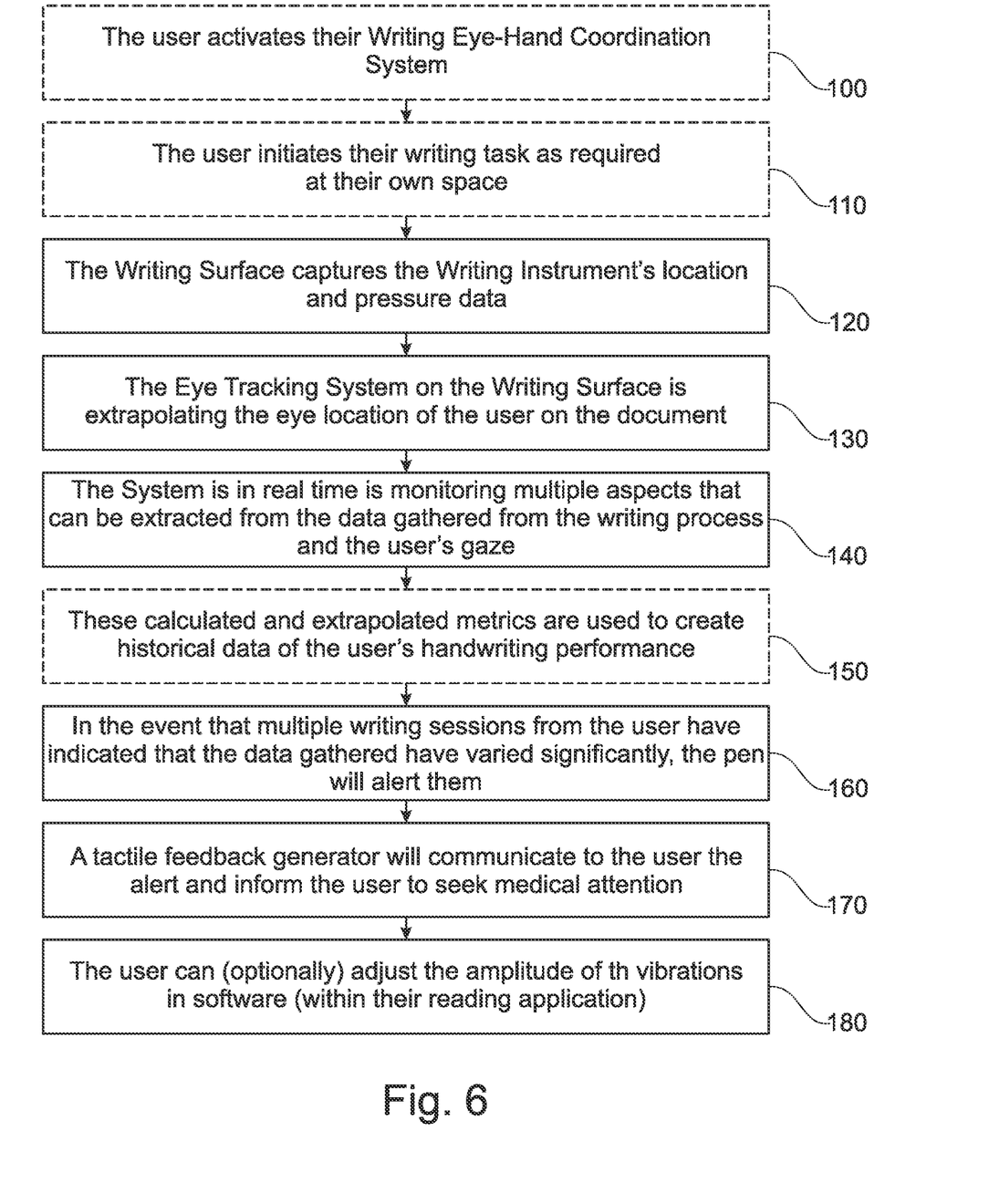
FIG. 6 illustrates a method flow chart for monitoring a fingertip strength of a writing instrument's user according to the present disclosure.

FIG. 6 illustrates a method flow chart for monitoring eye-hand coordination of a user of a digital writing instrument 20 according to the present disclosure.

In examples, during a step 100 of the method, the user activates their writing eye-hand coordination system. This may include that the user places a blank paper on the writing surface apparatus 60 on the indicated region. Also, one of the sensors can detect user activation of the system.

In examples, during a step 110, the user initiates their handwriting task with the digital writing instrument as required at their own pace. The device can directly face the user, such that the user's eyes are centered on the writing surface's center point.

In examples, during a step 120, the writing surface captures the writing instrument's location and pressure data.

In other words, the step 120, includes monitoring the location of a writing tip of the writing instrument during a writing session with the writing instrument.

In examples, during a step 130, the eye tracking system on the writing surface is extrapolating the eye location of the user on the document. The system may also determine the reading speed and direction of the user. The eye tracking process may be transparent to the user In other words, the step 130 includes monitoring the eye location of the user during the writing session.

In examples, during a step 140, the system is monitoring in real time multiple aspects that can be extracted from the data gathered from the writing process and the user's gaze including calculating the time between the user's pen moving to the next row and their gaze as they finish a sentence and including the discrepancy between the user's eye and pen location on the writing surface.

In other words, the step 140 includes generating data by correlating the locations of the writing tip and of the user's eyes. Generating data may comprise establishing a plurality of parameters such as eye latency, eye error, eye maximum velocity, and/or handwriting maximum velocity.

Generating data may further comprise calculating the time between the user's writing instrument movement to a next row of a writing session and the user's gaze when a sentence is finished and/or calculating a discrepancy between the user's eye and writing instrument location.

In examples, during a step 150, these calculated and extrapolated metrics are used to create historical data of the user's handwriting performance.

In examples, during a step 160, in the event that multiple writing sessions from the user have indicated that the data gathered have varied significantly, the system or the pen will alert the user. This may include providing the notification via the user's personal device.

In other words, the step 160 includes comparing the generated data to historical data from the user. Comparing may include generating a model of the user's handwriting performance from the stored historical data; and comparing the generated data to the model.

In examples, during a step 170, the tactile feedback generator 28 will communicate to the user the alert and inform the user to seek medical attention.

In other words, the step 170 includes providing an indication in case that data of a current writing session of the user deviates from an average of historical data from the user.

A measure for the deviation could be with respect to eye latency alone a difference of 80 ms or larger with a baseline of 400 ms i.e., approximately 30% difference. Regarding eye-hand coordination, a difference around 200 ms between MCI and control subjects with a baseline of 800 ms i.e., approximately 20% difference is considered. Overall, a deviation of around 10% could indicate AD, while anything larger than 30% could indicate MC.

In examples, during a step 180, the user can adjust the amplitude of the vibrations within their software application.

At least one step of this method is executed by the writing instrument 20. Additionally, or alternatively, at least one step of this method is executed by the digital surface device 60 comprising the writing surface.

The present disclosure also relates to the computer-implemented method for monitoring eye-hand coordination of a user of a digital writing instrument and the system for monitoring eye-hand coordination of its user of the following aspects:

1. A computer-implemented method for monitoring eye-hand coordination of a user of a digital writing instrument, comprising:
    monitoring the location of a writing tip of the writing instrument during a writing session with the writing instrument;
    monitoring the eye location of the user during the writing session;
    generating data by correlating the locations of the writing tip and of the user's eyes;
    comparing the generated data to historical data from the user; and
    providing an indication in case that data of a current writing session of the user deviates from an average of historical data from the user.
2. The method of aspect 1, comprising:
    storing generated data as historical data.
3. The method of one of the preceding aspects, wherein generating data comprises establishing a plurality of parameters such as eye latency, eye error, eye maximum velocity, and/or handwriting maximum velocity.
4. The method of one of the preceding aspects, wherein generating data comprises calculating the time between the user's writing instrument movement to a next row of a writing session and the user's gaze when a sentence is finished and/or calculating a discrepancy between the user's eye and writing instrument location.
5. The method of one of the preceding aspects, comprising:
    monitoring a force of the writing tip during a writing session; and
    generating data by correlating the force of the writing tip and the locations of the writing tip and of the user's eyes.
6. The method of one of the preceding aspects, comprising:
    generating a model of the user's handwriting performance from the stored historical data; and
    comparing the generated data to the model.
7. The method of one of the preceding aspects, comprising:
    providing a writing surface, wherein the writing surface is a sheet of paper or a display.
8. The method of one of the preceding aspects, comprising:
    alerting the user in case of an indication by activating a tactile feedback generator of the writing instrument; and/or
    providing haptic feedback to the user by activating a tactile feedback generator of the writing instrument.
9. The method of one of the preceding aspects, wherein the indication is provided via a user interface of the writing instrument or via a wireless communication system to an external device having an interface.
10. A system for monitoring eye-hand coordination of its user, comprising:
    a writing instrument comprising one or more sensors configured to monitor the location of a writing tip of the writing instrument during a writing session with the writing instrument;

a writing surface apparatus comprising
an eye tracking system configured to monitor the eye location of the user during the writing session;
the writing system further comprising a communication system configured to provide an indication in case that data of a current writing session of the user deviates from an average of historical data from the user, the communication system being part of the writing instrument or of the writing surface apparatus
a computer system configured to execute the computer-implemented method for monitoring eye-hand coordination according to one of the preceding aspects, wherein the computer system is part of the writing instrument or of the writing surface apparatus and
a storage system configured to store generated data as historical data, the storage system being part of the writing instrument or of the writing surface apparatus.

11. The system of aspect 10, wherein the writing instrument comprises:
a tactile feedback generator configured to alert the user in case that data of a current writing session of the user deviates from an average of historical data from the user; and/or
a tactile feedback generator configured to provide haptic feedback to the user.

12. The system of aspect 11, wherein the tactile feedback generator is configured to generate vibrations in the range of 0 to 500 Hz with a controllable amplitude.

13. The system of one of aspects 10 to 12, comprising:
a force sensor configured to monitor a force of the writing tip during a writing session, the force sensor being part of the writing instrument or of the writing surface apparatus, wherein the computer system is configured to
generate data by correlating the force of the writing tip and the locations of the writing tip and of the user's eyes.

14. The system of one of aspects 10 to 13, wherein the one or more sensors are configured to monitor at least one of cartesian coordinates of the writing tip location, a writing tip's force against the writing surface, a writing instrument's angle, a velocity of the writing instrument, an acceleration of the writing instrument, and a trajectory of the writing instrument.

15. The system of one of aspects 10 to 14, wherein the eye tracking system comprises an infrared light-emitting diode, a CMOS sensor configured to identify IR light, and a lens subassembly configured to focus received IR light to the CMOS sensor.

16. The system of one of aspects 10 to 15, wherein the writing instrument comprises:
a hand presence sensor configured to obtain information regarding a usage state of the writing instrument.

17. The system of one of aspects 10 to 16, wherein the writing instrument and/or the writing surface apparatus comprises:
a user interface configured to receive input from a user and/or to provide information to the user such as the indication; and/or
a wireless communication system configured to provide the indication via an external device having an interface.

18. The system of one of aspects 10 to 17, wherein the writing instrument comprises:
an ink reservoir configured to provide ink for writing.

19. A system for monitoring eye-hand coordination of its user, comprising:
a writing instrument (20),
a magnetic element fixed on the writing instrument
a writing surface apparatus (60) comprising
at least one magnetometer which is fixed on the writing surface apparatus (60) and is configured to measure a magnetic field that is generated by the magnetic element, thereby measuring the position and orientation of the writing instrument (20) during a writing session with the writing instrument (20)
an eye tracking system (70) configured to monitor the eye location of the user during the writing session;
the writing system (10) further comprising a communication system configured to provide an indication in case that data of a current writing session of the user deviates from an average of historical data from the user, the communication system being part of the writing surface apparatus (60)
a computer system configured to execute the computer-implemented method for monitoring eye-hand coordination according to one of the preceding aspects, wherein the computer system is part of the writing surface apparatus and
a storage system (82) configured to store generated data as historical data, the storage system being part of the of the writing surface apparatus (60).

20. The system according to aspect 19 wherein the magnetic element is a ring comprising an outer layer of magnetic material and an inner layer of elastic material.

The invention claimed is:

1. A system for monitoring eye-hand coordination of its user, comprising:
a writing instrument comprising one or more sensors configured to monitor a location of a writing tip of the writing instrument during a writing session with the writing instrument, wherein at least one of the one or more sensors is a magnetic element having a ring comprising an outer layer of magnetic material and an inner layer of elastic material;
a writing surface apparatus comprising an eye tracking system configured to monitor an eye location of the user during the writing session and calculate gaze data of the user based on monitoring the eye location, the gaze data including a location, a speed, and/or a direction of a gaze of the user, and at least one magnetometer which is fixed on the writing surface apparatus and is configured to measure a magnetic field that is generated by the magnetic element, thereby measuring a position and an orientation of the writing instrument during the writing session with the writing instrument;
a communication system configured to provide an alert in case that data of a current writing session of the user deviates from an average of historical data from the user, the communication system being part of the writing instrument or of the writing surface apparatus;
a computer system configured to execute a computer-implemented method for monitoring eye-hand coordination the method including:
monitoring the location of the writing tip of the writing instrument via the writing surface apparatus;
monitoring the eye location of user via the eye tracking system;
calculating gaze data of the user;

generating data by correlating data related to monitoring the location of the writing tip of the gaze data;

establishing a plurality of parameters based on the generated data, the plurality of parameters including eye latency, eye error, eye maximum velocity, and/or handwriting maximum velocity;

comparing currently generated data related to the plurality of parameters to historical data related to the plurality of parameters;

determining the currently generated data deviates from the average of the historical data; and alerting the user of the deviation via the communication system; and a storage system configured to store the historical data, the storage system being part of the writing instrument or of the writing surface apparatus.

2. The system of claim 1, wherein the writing instrument comprises:

a tactile feedback generator configured either to alert the user in case that data of a current writing session of the user deviates from an average of historical data from the user; and/or to provide haptic feedback to the user.

3. The system of claim 1, comprising:

a force sensor configured to monitor a force of the writing tip during the writing session, the force sensor being part of the writing instrument or of the writing surface apparatus, wherein the computer system is configured to generate data by correlating the force of the writing tip and the locations of the writing tip and a gaze of the user.

4. The system of claim 1, wherein the one or more sensors are configured to monitor at least one of cartesian coordinates of the writing tip location, a writing tip's force against the writing surface apparatus, a writing instrument's angle, a velocity of the writing instrument, an acceleration of the writing instrument, and a trajectory of the writing instrument.

5. The system of claim 1, wherein the eye tracking system comprises an infrared light-emitting diode, a CMOS sensor configured to identify IR light, and a lens subassembly configured to focus received IR light to the CMOS sensor.

6. The system of claim 1, wherein the writing instrument comprises:

a hand presence sensor configured to obtain information regarding a usage state of the writing instrument.

7. The system of claim 1, wherein the writing instrument and/or the writing surface apparatus comprises:

a user interface configured to receive input from the user and/or to provide information to the user, the information including the alert; and/or a wireless communication system configured to provide the alert via an external device having an interface.

8. A system for monitoring eye-hand coordination of its user, comprising:

a writing instrument;

a magnetic element fixed on the writing instrument, wherein the magnetic element is a ring comprising an outer layer of magnetic material and an inner layer of elastic material;

a writing surface apparatus comprising at least one magnetometer which is fixed on the writing surface apparatus and is configured to measure a magnetic field that is generated by the magnetic element, thereby measuring a position and an orientation of the writing instrument during a writing session with the writing instrument, and an eye tracking system configured to monitor an eye location of the user during the writing session;

a communication system configured to provide an indication in case that data of a current writing session of the user deviates from an average of historical data from the user, the communication system being part of the writing surface apparatus;

a computer system configured to execute a computer-implemented method for monitoring eye-hand coordination the method including:

monitoring a location of a writing tip of the writing instrument via the writing surface apparatus;

monitoring the eye location of user via the eye tracking system;

calculating gaze data of the user based on monitoring on monitoring the eye location, the gaze data including allocation, a speed, and/or a direction of a gaze of the user;

generating data by correlating data related to monitoring the location of the writing tip of the gaze data;

establishing a plurality of parameters based on the generated data, the plurality of parameters including eye latency, eye error, eye maximum velocity, and/or handwriting maximum velocity;

comparing currently generated data related to the plurality of parameters, to historical data related to the plurality of parameters;

determining the currently generated data deviates from an average of the historical data; and alerting the user of the deviation via the communication system; and a storage system configured to store the generated data as historical data, the storage system being part of the os writing surface apparatus.

9. The system of claim 8, wherein the computer-implemented method of the computing system further includes:

informing the user to seek medical attention based on the deviation.

* * * * *

UNITED STATES PATENT AND TRADEMARK OFFICE
CERTIFICATE OF CORRECTION

Page 1 of 1

PATENT NO. : 12,458,248 B2
APPLICATION NO. : 18/482653
DATED : November 4, 2025
INVENTOR(S) : Nikolaos Chrysanthakopoulos and Ion-Ioannis Antonakis It is certified that error appears in the above-identified patent and that said Letters Patent is hereby corrected as shown below:

In the Claims

Column 20, Line 46, in Claim 8, after "of the" delete "os".

Signed and Sealed this
Sixteenth Day of December, 2025

John A. Squires
*Director of the United States Patent and Trademark Office*